United States Patent
Chung

(10) Patent No.: US 11,078,935 B2
(45) Date of Patent: Aug. 3, 2021

(54) PREDICTION OF HYDRAULIC PUMP HEALTH AND FAILURE

(71) Applicant: The Boeing Company, Chicago, IL (US)

(72) Inventor: Dennis D. Chung, Arlington, WA (US)

(73) Assignee: The Boeing Company, Chicago, IL (US)

( * ) Notice: Subject to any disclaimer, the term of this patent is extended or adjusted under 35 U.S.C. 154(b) by 283 days.

(21) Appl. No.: 16/392,384

(22) Filed: Apr. 23, 2019

(65) Prior Publication Data
US 2020/0340504 A1 Oct. 29, 2020

(51) Int. Cl.
*F15B 19/00* (2006.01)
*B64C 13/50* (2006.01)
*F04B 51/00* (2006.01)
*G05B 19/414* (2006.01)

(52) U.S. Cl.
CPC .......... *F15B 19/005* (2013.01); *B64C 13/504* (2018.01); *F04B 51/00* (2013.01); *F15B 2211/20515* (2013.01); *F15B 2211/864* (2013.01); *F15B 2211/8633* (2013.01); *F15B 2211/8636* (2013.01); *G05B 19/414* (2013.01); *G05B 2219/41309* (2013.01)

(58) Field of Classification Search
CPC ...... F04B 23/04; F04B 49/002; F04B 49/065; F04B 49/20; G05B 19/414; G05B 2219/33337; G05B 2219/41309; G01L 19/02; G01L 19/146; G01L 19/147; G01L 9/0054; G01L 9/065
See application file for complete search history.

(56) References Cited

U.S. PATENT DOCUMENTS

| | | | | | |
|---|---|---|---|---|---|
| 5,628,229 | A | * | 5/1997 | Krone | F04B 49/065 702/130 |
| 7,082,758 | B2 | * | 8/2006 | Kageyama | E02F 9/20 60/329 |
| 9,556,887 | B2 | * | 1/2017 | Carpenter | B60T 17/22 |
| 2010/0313849 | A1 | * | 12/2010 | Stoner | B60K 6/12 123/350 |
| 2013/0096770 | A1 | * | 4/2013 | Behr | F15B 19/005 701/32.1 |
| 2018/0128705 | A1 | * | 5/2018 | Wetherill | F04B 49/06 |

* cited by examiner

*Primary Examiner* — Nimeshkumar D Patel
*Assistant Examiner* — Gedeon M Kidanu
(74) *Attorney, Agent, or Firm* — Haynes and Boone, LLP

(57) ABSTRACT

In one or more embodiments, a system for predicting health of a hydraulic pump comprises a reservoir tank temperature sensor to measure a temperature of a reservoir tank. The system further comprises a hydraulic pump temperature sensor to measure a temperature of the hydraulic pump. Also, the system comprises a differential pressure sensor to measure a differential pressure across a filter associated with the hydraulic pump. Further, the system comprises a processor(s) to determine a differential temperature by subtracting the temperature of the reservoir tank from the temperature of the hydraulic pump, to compare the differential temperature to a differential temperature threshold, to compare the differential pressure to a differential pressure threshold, and to generate an alert signal indicating failure of the hydraulic pump, when the processor(s) determines that the differential temperature exceeds the differential temperature threshold and the differential pressure exceeds the differential pressure threshold.

20 Claims, 11 Drawing Sheets

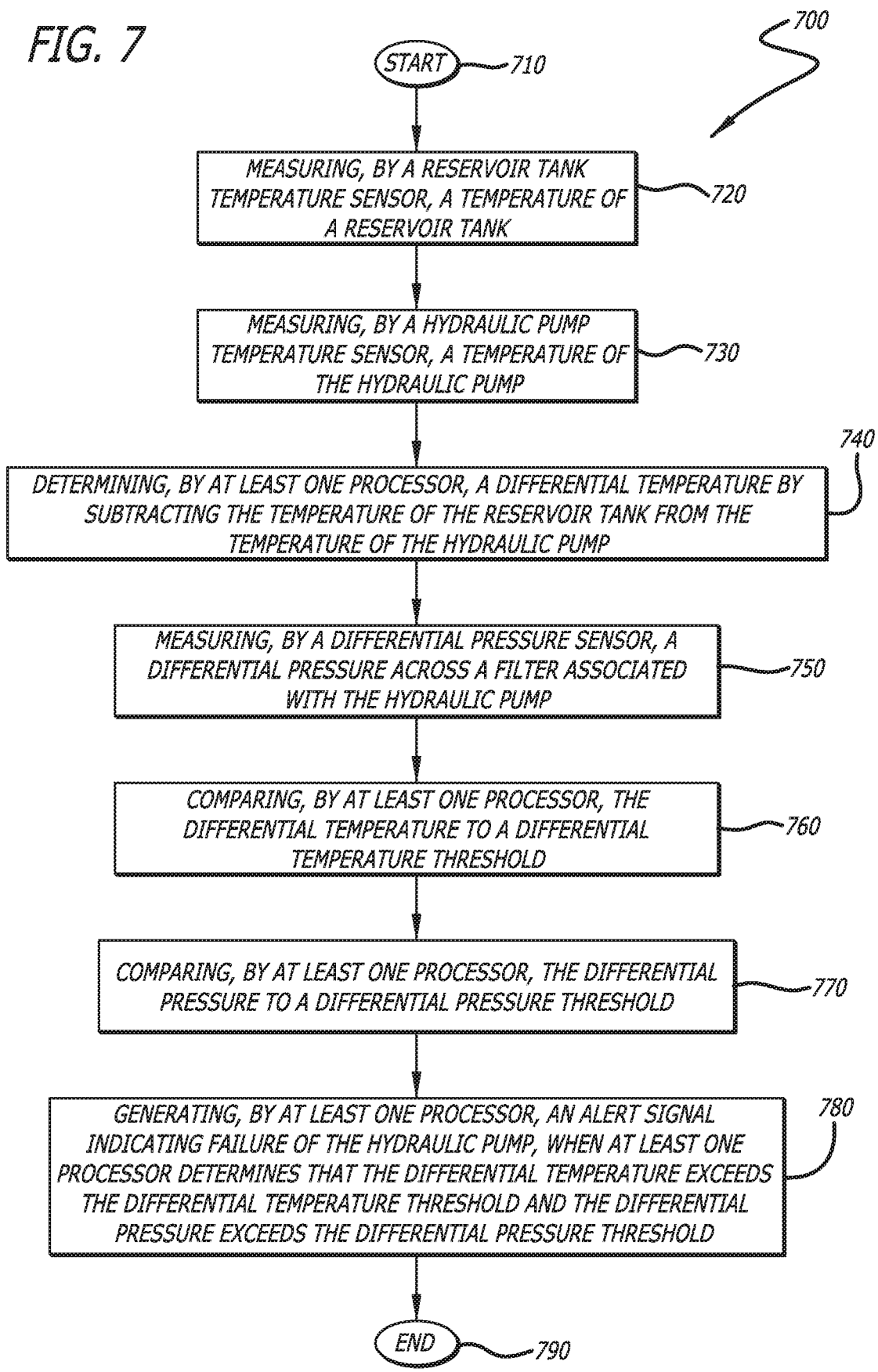

PREDICTION OF HYDRAULIC PUMP HEALTH AND FAILURE

FIELD

The present disclosure relates to hydraulic pumps. In particular, the present disclosure relates to prediction of hydraulic pump health and failure.

BACKGROUND

Currently, aircraft typically employ hydraulic systems for generating hydraulic power to control various systems of the aircraft. The hydraulic systems supply pressurized hydraulic fluid, which provides the hydraulic power, to operate airplane systems including, but not limited to, flight controls, landing gear actuation, nose landing gear steering, high lift devices, and thrust reversers.

Hydraulic systems generally comprise a hydraulic pump(s) (e.g., an engine-driven pump (EDP) and/or an electric motor pump (EMP)), which is used to pump the hydraulic fluid, as well as a reservoir tank(s), which is used to hold the hydraulic fluid. Currently, conventional systems monitor the differential temperature between a hydraulic pump and its associated the reservoir tank to determine whether the hydraulic pump has failed. The hydraulic pump is determined to have failed if the differential temperature exceeds a predetermined differential temperature threshold. The disadvantage with this conventional system of monitoring only one performance variable (e.g., the differential temperature) is that it can be unreliable and sometimes produce a false positive reading (i.e. the hydraulic pump is determined to have failed, but the hydraulic pump is actually still functional). A false positive reading can prompt the unnecessary and costly replacement of a fully functional hydraulic pump.

In light of the foregoing, there is a need for an improved system to provide a more reliable prediction of hydraulic pump health and failure.

SUMMARY

The present disclosure relates to a method, system, and apparatus for a prediction of hydraulic pump health and failure via airplane health management. In one or more embodiments, a method for predicting health of a hydraulic pump comprises measuring, by a reservoir tank temperature sensor, a temperature of a reservoir tank. The method further comprises measuring, by a hydraulic pump temperature sensor, a temperature of the hydraulic pump. Also, the method comprises determining, by at least one processor, a differential temperature by subtracting the temperature of the reservoir tank from the temperature of the hydraulic pump. In addition, the method comprises measuring, by a differential pressure sensor, a differential pressure across a filter associated with the hydraulic pump. Additionally, the method comprises comparing, by at least one processor, the differential temperature to a differential temperature threshold. Also, the method comprises comparing, by at least one processor, the differential pressure to a differential pressure threshold. Further, the method comprises generating, by at least one processor, an alert signal indicating failure of the hydraulic pump, when at least one processor determines that the differential temperature exceeds the differential temperature threshold and the differential pressure exceeds the differential pressure threshold.

In one or more embodiments, the method further comprises generating, by at least one processor, an alert signal indicating that the differential temperature exceeds the differential temperature threshold, when at least one processor determines that the differential temperature exceeds the differential temperature threshold and the differential pressure does not exceed the differential pressure threshold. In some embodiments, the alert signal indicating that the differential temperature exceeds the differential temperature threshold further indicates that the hydraulic pump should be monitored.

In at least one embodiment, the method further comprises generating, by at least one processor, an alert signal indicating that the differential pressure exceeds the differential pressure threshold, when at least one processor determines that the differential pressure exceeds the differential pressure threshold and the differential temperature does not exceed the differential temperature threshold. In some embodiments, the alert signal indicating that the differential pressure exceeds the differential pressure threshold further indicates that the hydraulic pump should be replaced or monitored.

In one or more embodiments, the filter is a case drain filter. In at least one embodiment, a vehicle comprises the hydraulic pump, the filter, and the reservoir tank. In some embodiments, the vehicle is an airborne vehicle, a terrestrial vehicle, or a marine vehicle. In at least one embodiment, when the vehicle is an airborne vehicle, the hydraulic pump provides hydraulic power to operate flight controls, landing gear actuation, nose landing gear steering, high lift devices, and/or thrust reversers. In some embodiments, the hydraulic pump is an engine-driven pump (EDP) or an electric motor pump (EMP).

In at least one embodiment, a system for predicting health of a hydraulic pump comprises a reservoir tank temperature sensor to measure a temperature of a reservoir tank. The system further comprises a hydraulic pump temperature sensor to measure a temperature of the hydraulic pump. Also, the system comprises a differential pressure sensor to measure a differential pressure across a filter associated with the hydraulic pump. Further, the system comprises at least one processor to determine a differential temperature by subtracting the temperature of the reservoir tank from the temperature of the hydraulic pump, to compare the differential temperature to a differential temperature threshold, to compare the differential pressure to a differential pressure threshold, and to generate an alert signal indicating failure of the hydraulic pump, when at least one processor determines that the differential temperature exceeds the differential temperature threshold and the differential pressure exceeds the differential pressure threshold.

In one or more embodiments, at least one processor is further to generate an alert signal indicating that the differential temperature exceeds the differential temperature threshold, when at least one processor determines that the differential temperature exceeds the differential temperature threshold and the differential pressure does not exceed the differential pressure threshold. In some embodiments, the alert signal indicating that the differential temperature exceeds the differential temperature threshold further indicates that the hydraulic pump should be monitored.

In at least one embodiment, at least one processor is further to generate an alert signal indicating that the differential pressure exceeds the differential pressure threshold, when at least one processor determines that the differential pressure exceeds the differential pressure threshold and the differential temperature does not exceed the differential temperature threshold. In some embodiments, the alert signal indicating that the differential pressure exceeds the differential pressure threshold further indicates that the hydraulic pump should be replaced or monitored.

In one or more embodiments, a vehicle comprises the system. In some embodiments, the vehicle is an airborne vehicle, a terrestrial vehicle, or a marine vehicle.

The features, functions, and advantages can be achieved independently in various embodiments of the present disclosure or may be combined in yet other embodiments.

DRAWINGS

These and other features, aspects, and advantages of the present disclosure will become better understood with regard to the following description, appended claims, and accompanying drawings where:

FIG. 7 is a flow chart showing the disclosed method for prediction of hydraulic pump health and failure, in accordance with at least one embodiment of the present disclosure.

DESCRIPTION

Figure 1:
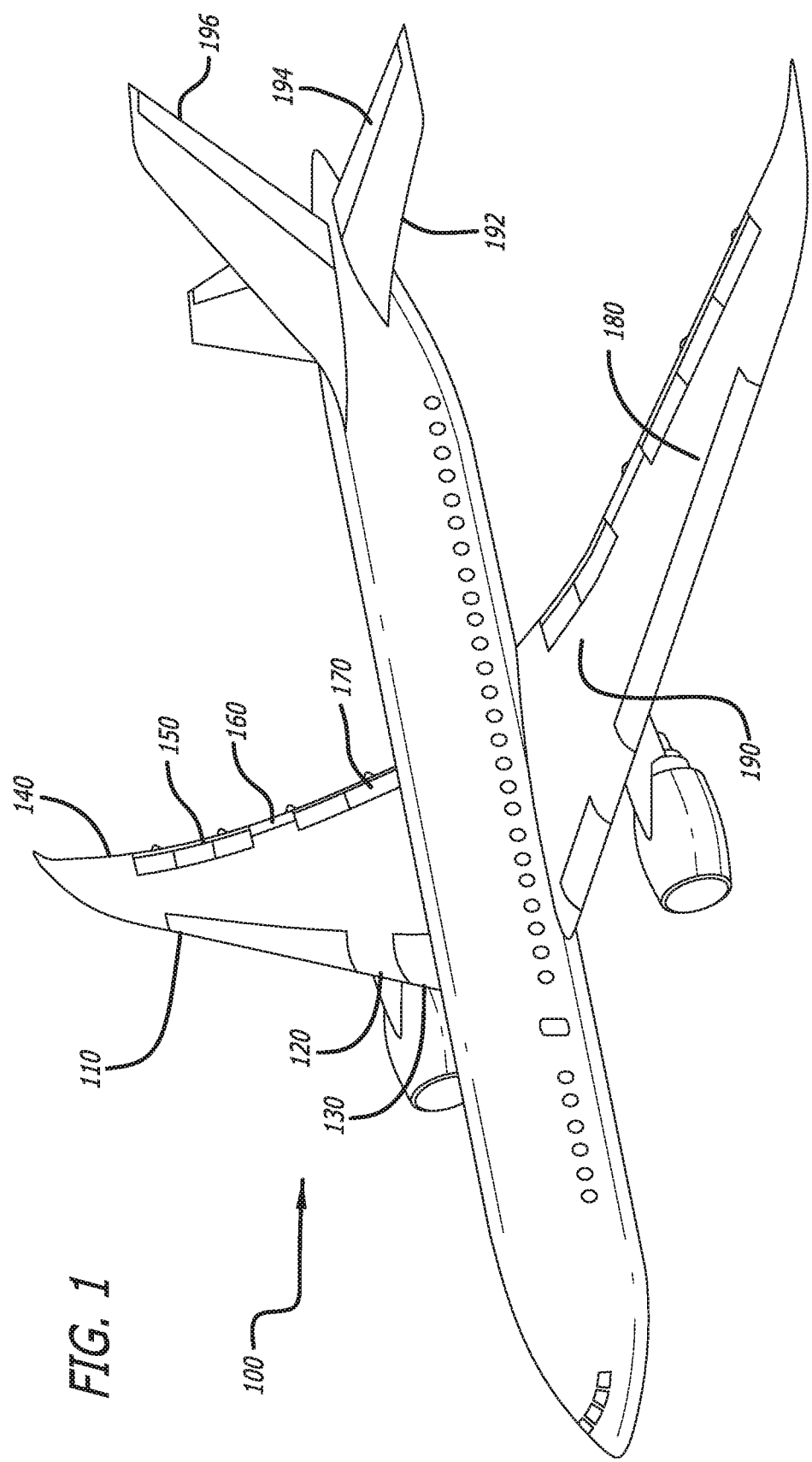
FIG. 1 is a diagram showing an exemplary vehicle that may employ the disclosed system for prediction of hydraulic pump health and failure, in accordance with at least one embodiment of the present disclosure.

The methods and apparatus disclosed herein provide an operative system for prediction of hydraulic pump health and failure (e.g., via airplane health management). In one or more embodiments, the system of the present disclosure monitors (1) the differential temperature (e.g., due to heat rejection via the operation of the hydraulic pump) between a hydraulic pump and its associated the reservoir tank as well as (2) the differential pressure (e.g., due to metal chips collected by the hydraulic pump) across a filter (e.g., a case drain filter) associated with the hydraulic pump to predict health of the hydraulic pump.

As previously mentioned above, aircraft typically employ hydraulic systems for generating hydraulic power to control various systems of the aircraft. These hydraulic systems generally comprise a hydraulic pump(s) (e.g., an engine-driven pump (EDP) and/or an electric motor pump (EMP)), which is used to pump the hydraulic fluid, as well as a reservoir tank(s), which is used to hold the hydraulic fluid. Currently, conventional systems monitor the differential temperature between a hydraulic pump and its associated the reservoir tank to determine whether the hydraulic pump has failed. The hydraulic pump is determined to have failed if the differential temperature exceeds a predetermined differential temperature threshold. The disadvantage with this conventional system of monitoring only one performance variable (i.e. the differential temperature) is that it can be unreliable and sometimes produce a false positive reading (i.e. the hydraulic pump is determined to have failed, but the hydraulic pump is actually still functional). A false positive reading can prompt the unnecessary and costly replacement of a fully functional hydraulic pump.

The system of the present disclosure, along with monitoring the differential temperature, monitors the differential pressure across a filter associated with the hydraulic pump to predict the health and failure of the hydraulic pump. This monitoring of two performance variables (i.e. the differential temperature and the differential pressure), as opposed to only monitoring one performance variable (i.e. the differential temperature), increases the accuracy of prediction of the health and failure of the hydraulic pump.

In the following description, numerous details are set forth in order to provide a more thorough description of the system. It will be apparent, however, to one skilled in the art, that the disclosed system may be practiced without these specific details. In the other instances, well known features have not been described in detail, so as not to unnecessarily obscure the system.

Embodiments of the present disclosure may be described herein in terms of functional and/or logical components and various processing steps. It should be appreciated that such components may be realized by any number of hardware, software, and/or firmware components configured to perform the specified functions. For example, an embodiment of the present disclosure may employ various integrated circuit components (e.g., memory elements, digital signal processing elements, logic elements, look-up tables, or the like), which may carry out a variety of functions under the control of one or more processors, microprocessors, or other control devices. In addition, those skilled in the art will appreciate that embodiments of the present disclosure may be practiced in conjunction with other components, and that the systems described herein are merely example embodiments of the present disclosure.

For the sake of brevity, conventional techniques and components related to hydraulic systems, and other functional aspects of the system (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in one or more embodiments of the present disclosure.

Exemplary System Architecture

FIG. 1 is a diagram showing an exemplary vehicle 100 that may employ the disclosed system for prediction of hydraulic pump health and failure, in accordance with at least one embodiment of the present disclosure. In this figure, the vehicle 100 is shown to be an aircraft. The vehicle (e.g., aircraft) 100 comprises at least one hydraulic system to supply pressurized hydraulic fluid, which provides hydraulic power, to operate various different airplane systems. The various different airplane systems that may be powered by the hydraulic power include, but are not limited to, flight controls, landing gear actuation, nose landing gear steering, high lift devices, and thrust reversers. For example, the hydraulic system(s) may be used to power outboard leading edge slats 110, krueger slats 120, inboard leading edge slats 130, ailerons 140, outboard flaps 150, flaperons 160, inboard flaps 170, outboard spoilers 180, inboard spoilers 190, a horizontal stabilizer 192, elevators 194, and/or a rudder 196 of the vehicle (e.g., aircraft) 100.

It should be noted that, in one or more embodiments, various different types of vehicles may employ the disclosed system for prediction of hydraulic pump health and failure including, but not limited to, airborne vehicles (e.g., aircraft), terrestrial vehicles (e.g., trucks, cars, tanks, and trains), and marine vehicles (e.g., boats and ships).

Figure 2:
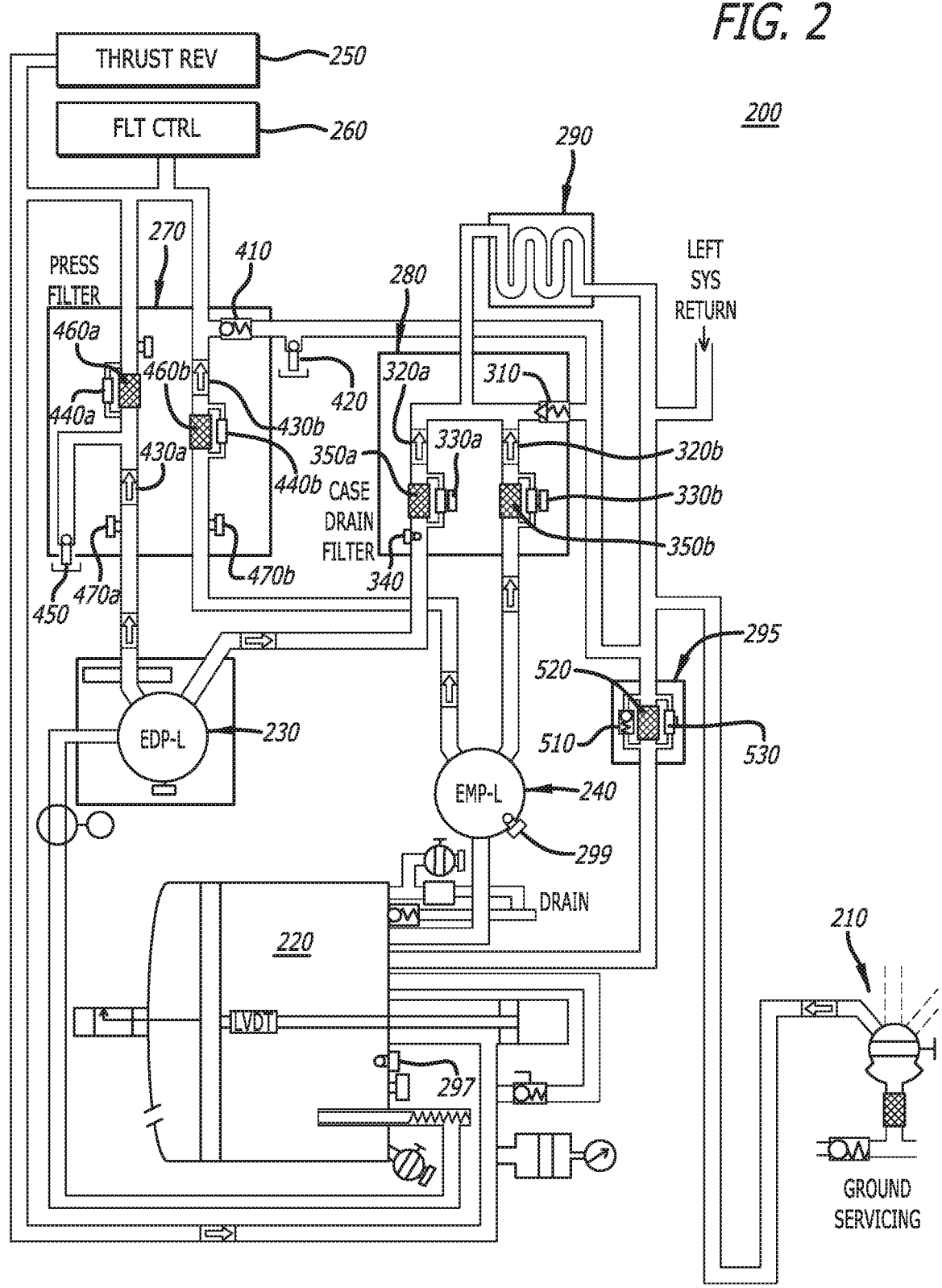
FIG. 2 is a diagram showing an exemplary hydraulic system (e.g., a left hydraulic system of an aircraft) that may employ the disclosed system for prediction of hydraulic pump health and failure, in accordance with at least one embodiment of the present disclosure.

FIG. 2 is a diagram showing an exemplary hydraulic system (e.g., a left hydraulic system of an aircraft) 200 that may employ the disclosed system for prediction of hydraulic pump health and failure, in accordance with at least one embodiment of the present disclosure. In this figure, the hydraulic system 200 is a left hydraulic system of a vehicle (i.e. an aircraft) 200. It should be noted that the center hydraulic system and the right hydraulic system of the vehicle (i.e. an aircraft) 200 function similarly.

In this figure, hydraulic fluid is supplied to the hydraulic system 200 via a ground servicing valve 210. The hydraulic system 200 comprises a reservoir tank 220 that holds hydraulic fluid, and supplies pressurized hydraulic fluid to a left engine driven pump (EDP-L) 230 and a left engine motor pump (EMP-L) 240.

The left engine driven pump (EDP-L) 230 operates as a primary pump, which usually operates continuously, and the left engine motor pump (EMP-L) 240 operates as a demand pump, which usually operates only when more pressure is necessary during high demand conditions. The left engine driven pump (EDP-L) 230 and the left engine motor pump (EMP-L) 240 pump the pressurized hydraulic fluid via a pressure filter module 270 to power the thrust reversers 250 and flight controls 260 of the vehicle (i.e. aircraft) 200. In addition, the left engine driven pump (EDP-L) 230 and the left engine motor pump (EMP-L) 240 pump the pressurized hydraulic fluid via a case drain filter module 280 to a heat exchanger 290, which is used to cool the hydraulic fluid. After the hydraulic fluid is cooled through the heat exchanger 290, the hydraulic fluid returns to the reservoir tank 220 via a return filter module 295.

The temperature sensor (e.g., a hydraulic pump temperature sensor) 299 measures the temperature of the hydraulic fluid within the left engine motor pump (EMP-L) 240, which is the temperature of the left engine motor pump (EMP-L) 240. The temperature sensor 299 transmits the measured temperature data to at least one processor (e.g., refer processor(s) 610 of FIG. 6) for processing.

A reservoir tank temperature sensor 297 measures the temperature of reservoir tank 220. The reservoir tank temperature sensor 297 transmits the measured temperature data to at least one processor (e.g., refer processor(s) 610 of FIG. 6) for processing.

Figure 3:
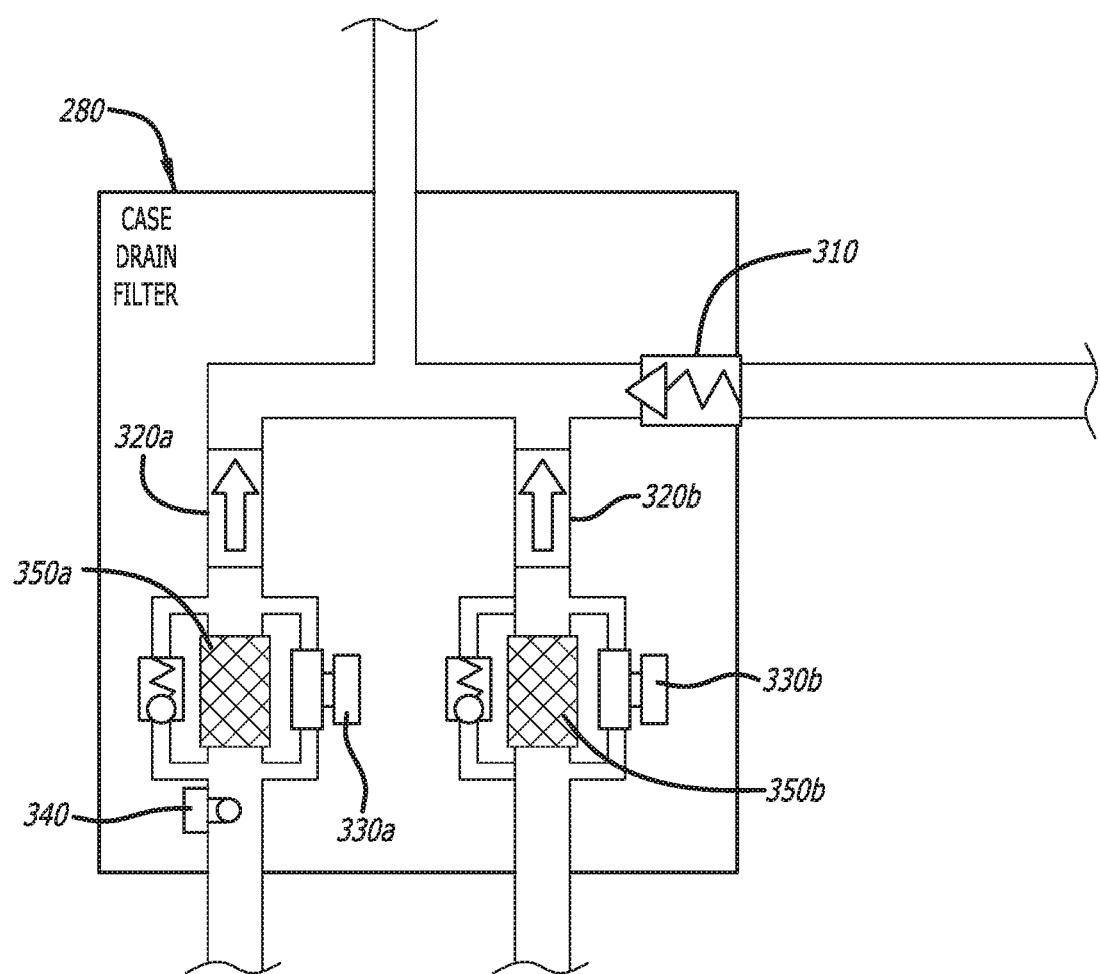
FIG. 3 is a diagram showing an enlarged view of the case drain filter module of the exemplary hydraulic system of FIG. 2, in accordance with at least one embodiment of the present disclosure.

FIG. 3 is a diagram showing an enlarged view of the case drain filter module 280 of the exemplary hydraulic system 200 of FIG. 2, in accordance with at least one embodiment of the present disclosure. In this figure, the case drain filter module 280 is shown to have a thermal bypass valve 310, check valves 320a, 320b, differential pressure sensors 330a, 330b, filter elements 350a, 350b, and a temperature sensor 340.

The filter elements 350a, 350b, each comprise a replaceable, non-cleanable, micronic filter element. The filter elements 350a, 350b remove (e.g., filter out) contamination (e.g., metal chips) from the hydraulic fluid from the left engine driven pump (EDP-L) 230 and the left engine motor pump (EMP-L) 240 pump, respectively.

The differential pressure sensors 330a, 330b measure the pressure difference between the inlet and outlet sides of the filter elements 350a, 350b, respectively. A measurement of high pressure indicates that the filter element 350a, 350b is clogged. The differential pressure sensors 330a, 330b transmit the measured pressure data to at least one processor (e.g., refer processor(s) 610 of FIG. 6) for processing.

The temperature sensor (e.g., a hydraulic pump temperature sensor) 340 measures the temperature of the hydraulic fluid supplied from the left engine driven pump (EDP-L) 230, which is essentially the temperature of the left engine driven pump (EDP-L) 230. The temperature sensor 340 transmits the measured temperature data to at least one processor (e.g., refer processor(s) 610 of FIG. 6) for processing.

The check valves 320a, 320b ensure a one-way flow of the hydraulic fluid in the direction of the arrow drawn on each check valve 320a, 320b. The thermal bypass valve 310 opens and closes to control the temperature of the hydraulic fluid. When the hydraulic fluid is at low temperatures, the thermal bypass valve 310 is open so that the hydraulic fluid flows to the return line back down to the reservoir tank 220. And, when the hydraulic fluid is at high temperatures, the thermal bypass valve 320 is closed to divert the hydraulic fluid to the heat exchanger 290 for cooling.

Figure 4:
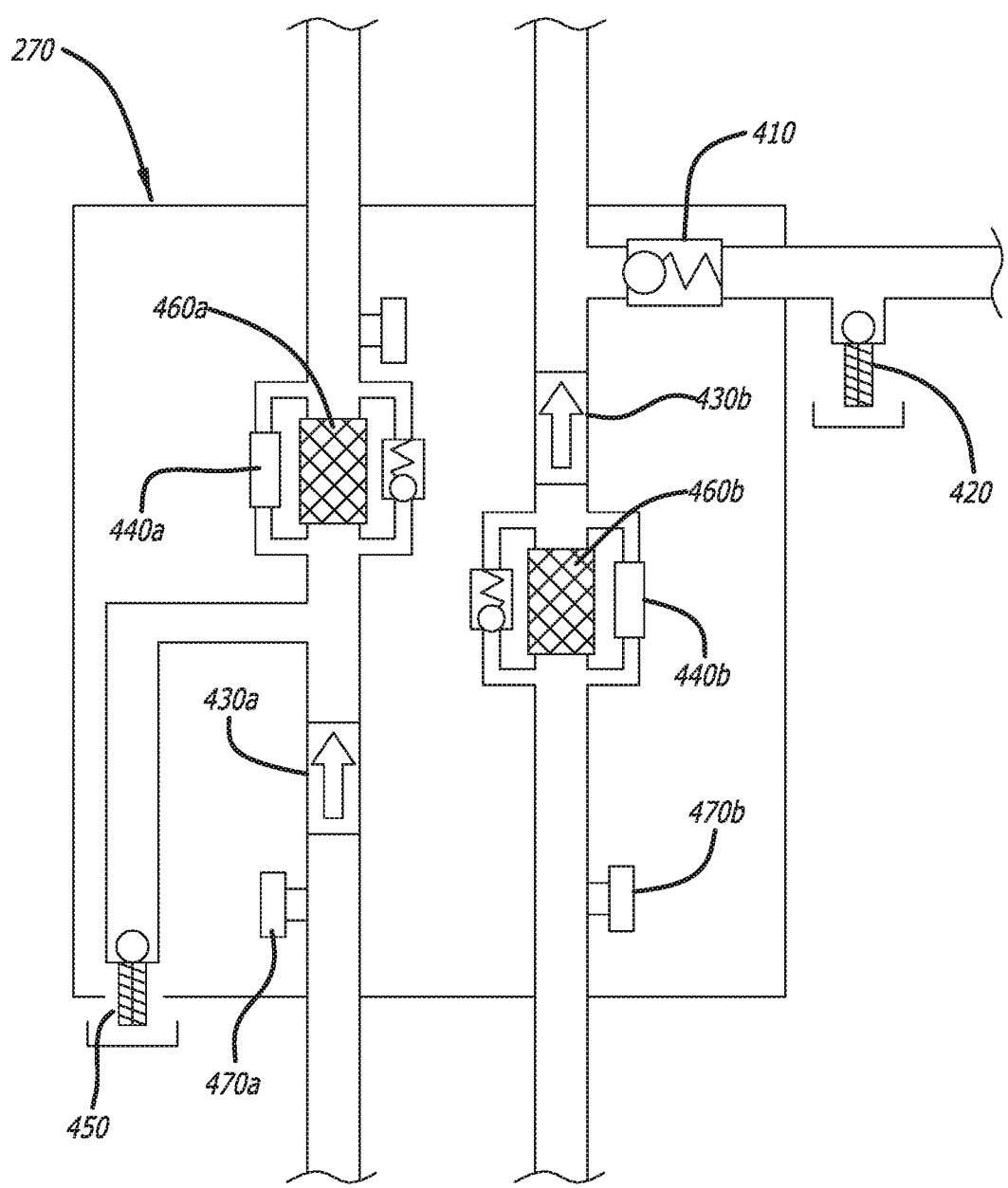
FIG. 4 is a diagram showing an enlarged view of the pressure filter module of the exemplary hydraulic system of FIG. 2, in accordance with at least one embodiment of the present disclosure.

FIG. 4 is a diagram showing an enlarged view of the pressure filter module 270 of the exemplary hydraulic system 200 of FIG. 2, in accordance with at least one embodiment of the present disclosure. In this figure, the pressure filter module 270 is shown to have a ground service supply quick disconnect (QD) 450, a ground service return quick disconnect (QD) 420, a relief valve 410, check valves 430a, 430b, filter elements 460a, 460b, differential pressure indicators 440a, 440b, and pressure sensors 470a, 470b.

The filter elements 460a, 460b remove contamination (e.g., metal chips) the hydraulic fluid from the left engine driven pump (EDP-L) 230 and the left engine motor pump (EMP-L) 240 pump, respectively. The filter elements 460a, 460b cannot be cleaned, and can only be removed to be replaced.

The differential pressure indicators 440a, 440b each have a pop-up button that pops out to indicate that its respective filter element 460a, 460b is clogged, and needs to be replaced.

The ground service supply quick disconnect 450 and the ground service return quick disconnect 420 let the system be connected to a ground source to pressurize the hydraulic system.

Figure 5:
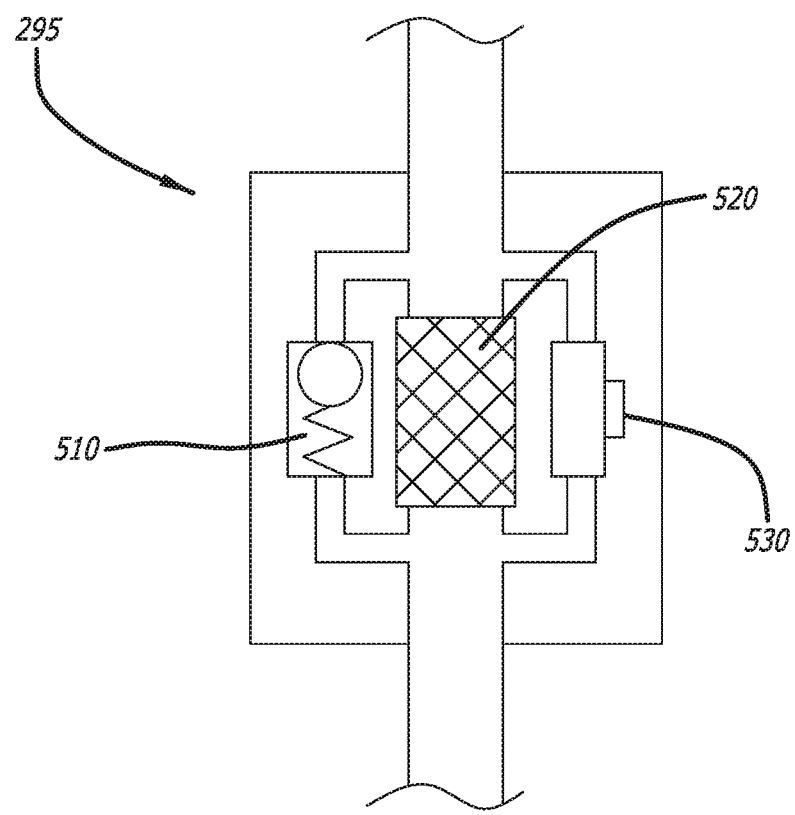
FIG. 5 is a diagram showing an enlarged view of the return filter module of the exemplary hydraulic system of FIG. 2, in accordance with at least one embodiment of the present disclosure.

FIG. 5 is a diagram showing an enlarged view of the return filter module 295 of the exemplary hydraulic system 200 of FIG. 2, in accordance with at least one embodiment of the present disclosure. The return filter module 295 is shown to have a bypass valve 510, a filter element 520, and a differential pressure indicator 530. The return filter module 295 removes contamination from the hydraulic fluid before the hydraulic fluid returns back to the reservoir tank 220. If the filter element 520 clogs, the bypass valve 510 opens to allow for the hydraulic fluid to flow through. The filter element 520 cannot cleaned, and can only be removed to be replaced. The differential pressure indicator 530 has a pop-up button that pops out to indicate that filter element 520 is clogged, and needs to be replaced.

Figure 6A:
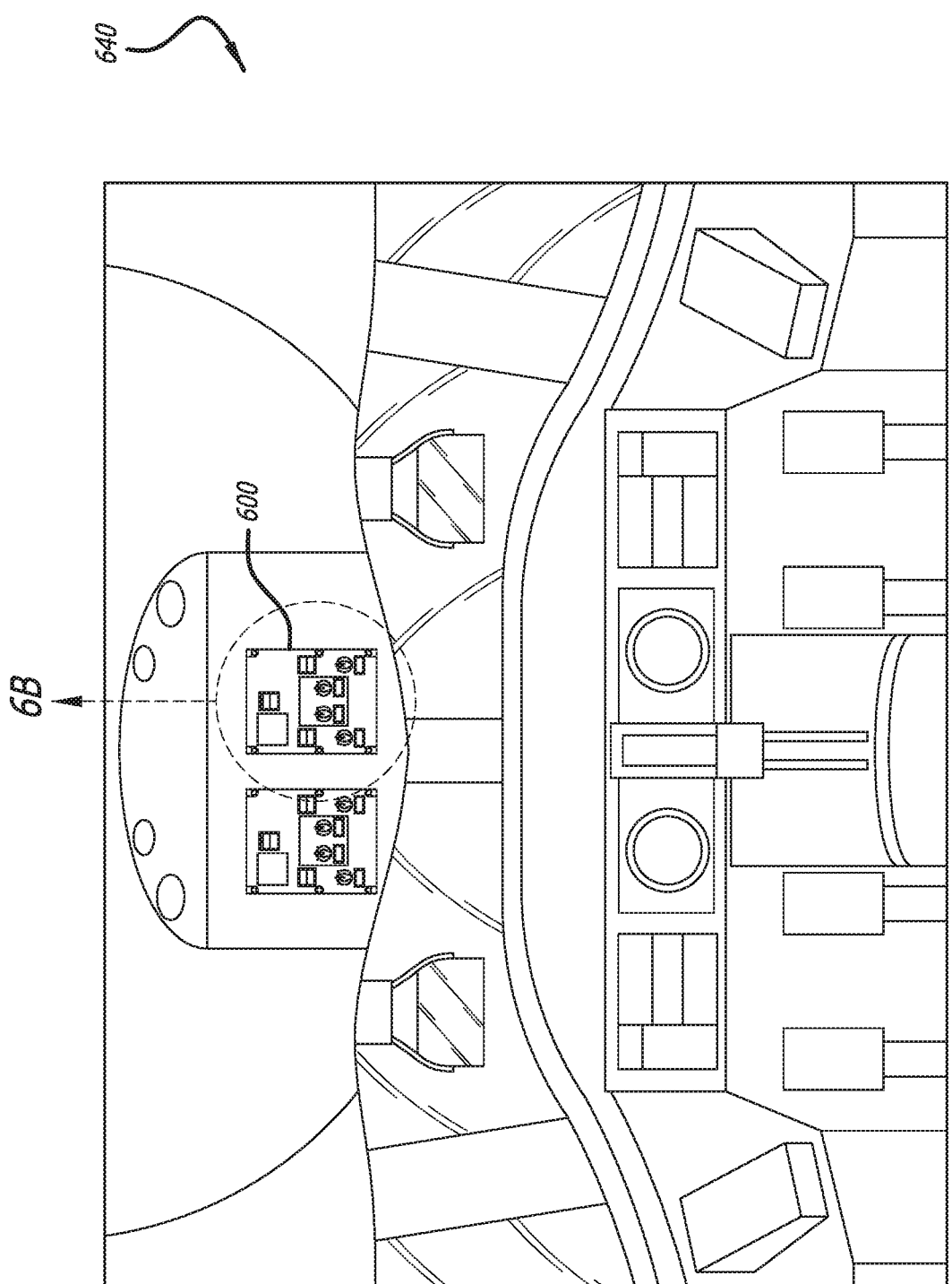
FIG. 6A is a diagram showing an exemplary control compartment of a vehicle that includes an exemplary hydraulic control panel that may be employed for the disclosed system for prediction of hydraulic pump health and failure, in accordance with at least one embodiment of the present disclosure.
Figure 6B:
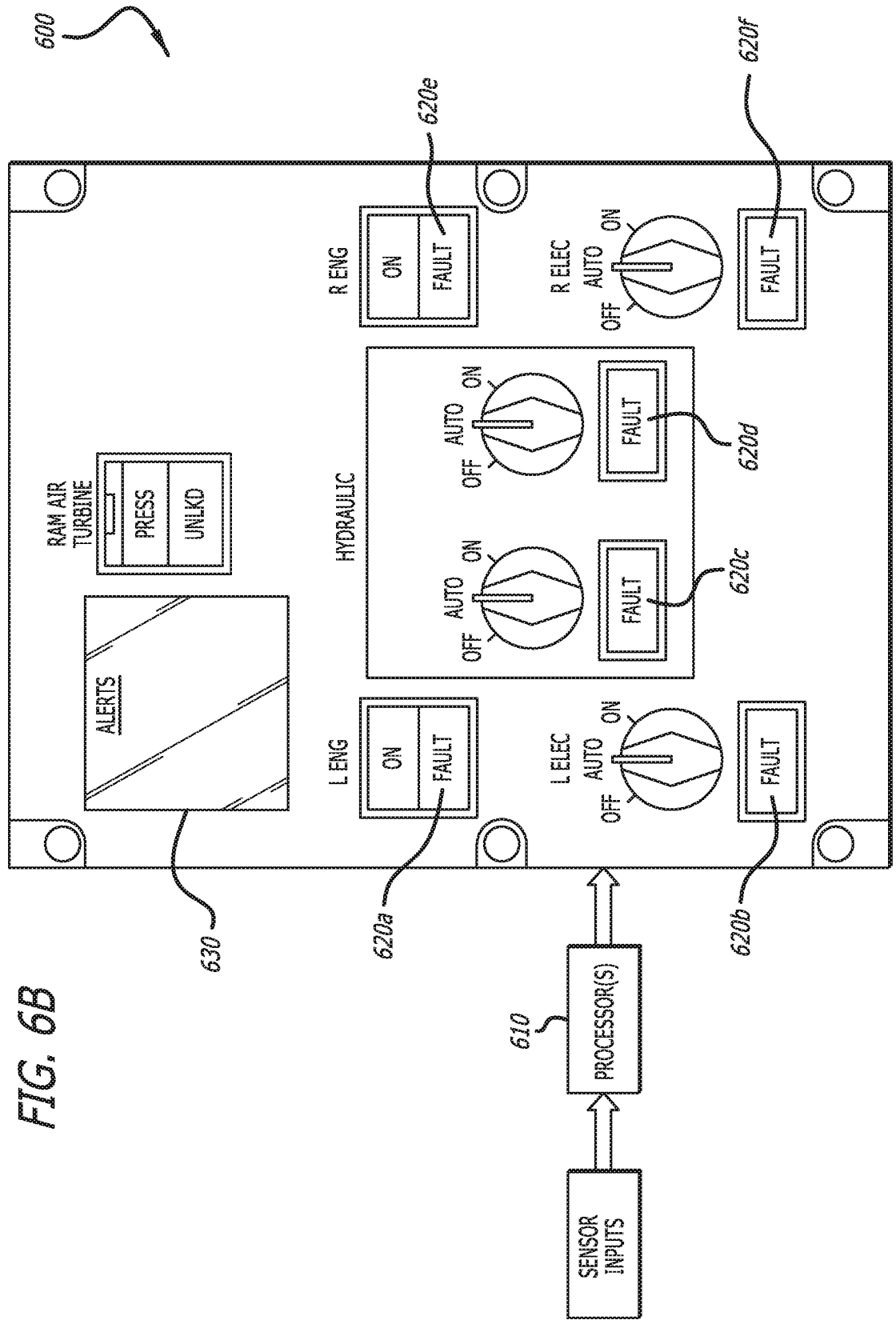
FIG. 6B is a diagram showing details of the exemplary hydraulic control panel of FIG. 6A, in accordance with at least one embodiment of the present disclosure.

FIG. 6A is a diagram showing an exemplary control compartment (e.g., cockpit) 640 of a vehicle (e.g., aircraft) 100 that includes an exemplary hydraulic control panel 600 that may be employed for the disclosed system for prediction of hydraulic pump health and failure, in accordance with at least one embodiment of the present disclosure. FIG. 6B is a diagram showing details of the exemplary hydraulic control panel 600 of FIG. 6A, in accordance with at least one embodiment of the present disclosure. In this figure, the hydraulic control panel 600, which may be mounted within the control compartment (e.g., cockpit) 640 of the vehicle (e.g., aircraft) 100, is shown to comprise six fault lights 620a-620f.

Each fault light 620a-620f corresponds to one of the hydraulic pumps 230, 240 of the vehicle 100. For this example, the vehicle (e.g., aircraft) 100 comprises six hydraulic pumps (i.e. EDP-L 230 and EMP-L 240 of the left hydraulic system 200, EMP-C1 and EMP-C2 of the center hydraulic system (not shown), and EMP-R and EDP-R of the right hydraulic system (not shown)). In particular, fault light 620a corresponds to the EDP-L hydraulic pump 230, fault light 620b corresponds to the EMP-L hydraulic pump 240, fault light 620c corresponds to the EMP-C1 hydraulic pump, fault light 620d corresponds to the EMP-C2 hydraulic pump, fault light 620e corresponds to the EDP-R hydraulic pump, and fault light 620f corresponds to the EMP-R hydraulic pump. A fault light 620a-620f will illuminate when it is determined that its corresponding hydraulic pump 230, 240 has failed (e.g., fault light 620a will illuminate when it is determined that the EDP-L hydraulic pump 230 has failed).

The hydraulic control panel 600 is also shown to comprises an alert display 630. The alert display will display various different alert notifications to the pilot regarding the health and failure of the hydraulic pumps 230, 240.

Operation of the Disclosed System

A. Prediction of Left Engine Drive Pump (EDP-L) 230

During operation of the disclosed system for prediction of hydraulic pump health and failure for evaluation of the left engine drive pump (EDP-L) 230, referring to FIG. 2, the reservoir tank temperature sensor 297 measures a temperature of the reservoir tank 220. The reservoir tank temperature sensor 297 transmits the measured temperature data (i.e. the temperature of the reservoir tank 220) to at least one processor (e.g., refer processor(s) 610 of FIG. 6) for processing. In one or more embodiments, the processor(s) 610 is located onboard the vehicle (e.g., aircraft) 100. However, it should be noted that in other embodiments, the processor(s) 610 may be located at a location remote from the vehicle 100.

Also, during operation, the hydraulic pump temperature sensor 340 measures a temperature of the hydraulic fluid supplied from the left engine driven pump (EDP-L) 230, which is essentially the temperature of the left engine driven pump (EDP-L) 230. The hydraulic pump temperature sensor 340 transmits the measured temperature data to at least one processor (e.g., refer processor(s) 610 of FIG. 6) for processing. At least one processor (e.g., refer processor(s) 610 of FIG. 6) determines the differential temperature by subtracting the temperature of the reservoir tank 220 from the temperature of the left engine drive pump (EDP-L) 230. At least one processor (e.g., refer processor(s) 610 of FIG. 6) compares the differential temperature to a differential temperature threshold (e.g., a predetermined differential temperature threshold) to determine whether the differential temperature exceeds the differential temperature threshold.

The differential pressure sensor 330a measures a pressure difference between the inlet and outlet sides of the filter element 350a. The hydraulic fluid supplied from the left engine driven pump (EDP-L) 230 is filtered through filter element 350a. At least one processor (e.g., refer processor(s) 610 of FIG. 6) compares the differential pressure to a differential pressure threshold (e.g., a predetermined differential temperature threshold) to determine whether the differential pressure exceeds the differential pressure threshold.

When at least one processor (e.g., refer processor(s) 610 of FIG. 6) determines that the differential temperature exceeds the differential temperature threshold, and that the differential pressure exceeds the differential pressure threshold, at least one processor (e.g., refer processor(s) 610 of FIG. 6) generates an alert signal(s) indicating failure of the left engine driven pump (EDP-L) 230 (e.g., by illuminating the fault light 620a on the hydraulic control panel 600 and/or by displaying an alert notification message on the alert display 630 of the hydraulic control panel 600 that the left engine driven pump (EDP-L) 230 has failed because the differential temperature exceeds the differential temperature threshold, and the differential pressure exceeds the differential pressure threshold).

When at least one processor (e.g., refer processor(s) 610 of FIG. 6) determines that the differential temperature exceeds the differential temperature threshold, but that the differential pressure does not exceed the differential pressure threshold, at least one processor (e.g., refer processor(s) 610 of FIG. 6) generates an alert signal(s) indicating that the differential temperature associated with the left engine driven pump (EDP-L) 230 exceeds the differential temperature threshold (e.g., by displaying an alert notification message on the alert display 630 of the hydraulic control panel 600 that the differential temperature associated with the left engine driven pump (EDP-L) 230 exceeds the differential temperature threshold and/or that the left engine driven pump (EDP-L) 230 should be monitored).

When at least one processor (e.g., refer processor(s) 610 of FIG. 6) determines that the differential pressure exceeds the differential pressure threshold, but that the differential temperature does not exceed the differential temperature threshold, at least one processor (e.g., refer processor(s) 610 of FIG. 6) generates an alert signal(s) indicating that the differential pressure associated with the left engine driven pump (EDP-L) 230 exceeds the differential pressure threshold (e.g., by displaying an alert notification message on the alert display 630 of the hydraulic control panel 600 that the differential pressure associated with the left engine driven pump (EDP-L) 230 exceeds the differential pressure threshold and/or that the left engine driven pump (EDP-L) 230 should be monitored or replaced).

B. Prediction of Left Engine Motor Pump (EMP-L) 240

During operation of the disclosed system for prediction of hydraulic pump health and failure for evaluation of the left engine motor pump (EMP-L) 240, referring to FIG. 2, the reservoir tank temperature sensor 297 measures a temperature of the reservoir tank 220. The reservoir tank temperature sensor 297 transmits the measured temperature data (i.e. the temperature of the reservoir tank 220) to at least one processor (e.g., refer processor(s) 610 of FIG. 6) for processing. In one or more embodiments, the processor(s) 610 is located onboard the vehicle (e.g., aircraft) 100. However, it should be noted that in other embodiments, the processor(s) 610 may be located at a location remote from the vehicle 100.

Also, during operation, the hydraulic pump temperature sensor 299 measures the temperature of the hydraulic fluid within the left engine motor pump (EMP-L) 240, which is the temperature of the left engine motor pump (EMP-L) 240. The hydraulic pump temperature sensor 299 transmits the measured temperature data to at least one processor (e.g., refer processor(s) 610 of FIG. 6) for processing. At least one processor (e.g., refer processor(s) 610 of FIG. 6) determines the differential temperature by subtracting the temperature of the reservoir tank 220 from the temperature of the left engine motor pump (EMP-L) 240. At least one processor (e.g., refer processor(s) 610 of FIG. 6) compares the differential temperature to a differential temperature threshold (e.g., a predetermined differential temperature threshold) to determine whether the differential temperature exceeds the differential temperature threshold.

The differential pressure sensor 330b measures a pressure difference between the inlet and outlet sides of the filter element 350b. The hydraulic fluid supplied from the left engine motor pump (EMP-L) 240 is filtered through filter element 350b. At least one processor (e.g., refer processor(s) 610 of FIG. 6) compares the differential pressure to a differential pressure threshold (e.g., a predetermined differential temperature threshold) to determine whether the differential pressure exceeds the differential pressure threshold.

When at least one processor (e.g., refer processor(s) 610 of FIG. 6) determines that the differential temperature exceeds the differential temperature threshold, and that the differential pressure exceeds the differential pressure threshold, at least one processor (e.g., refer processor(s) 610 of FIG. 6) generates an alert signal(s) indicating failure of the left engine motor pump (EMP-L) 240 (e.g., by illuminating the fault light 620b on the hydraulic control panel 600 and/or by displaying an alert notification message on the alert display 630 of the hydraulic control panel 600 that the left engine driven pump (EDP-L) 230 has failed because the differential temperature exceeds the differential temperature threshold, and the differential pressure exceeds the differential pressure threshold).

When at least one processor (e.g., refer processor(s) 610 of FIG. 6) determines that the differential temperature exceeds the differential temperature threshold, but that the differential pressure does not exceed the differential pressure threshold, at least one processor (e.g., refer processor(s) 610 of FIG. 6) generates an alert signal(s) indicating that the differential temperature associated with the left engine motor pump (EMP-L) 240 exceeds the differential temperature threshold (e.g., by displaying an alert notification message on the alert display 630 of the hydraulic control panel 600 that the differential temperature associated with the left engine motor pump (EMP-L) 240 exceeds the differential temperature threshold and/or that the left engine motor pump (EMP-L) 240 should be monitored).

When at least one processor (e.g., refer processor(s) 610 of FIG. 6) determines that the differential pressure exceeds the differential pressure threshold, but that the differential temperature does not exceed the differential temperature threshold, at least one processor (e.g., refer processor(s) 610 of FIG. 6) generates an alert signal(s) indicating that the differential pressure associated with the left engine motor pump (EMP-L) 240 exceeds the differential pressure threshold (e.g., by displaying an alert notification message on the alert display 630 of the hydraulic control panel 600 that the differential pressure associated with the left engine motor pump (EMP-L) 240 exceeds the differential pressure threshold and/or that the left engine motor pump (EMP-L) 240 should be monitored or replaced).

C. Exemplary Disclosed Methods

FIG. 7 is a flow chart showing the disclosed method 700 for prediction of hydraulic pump health and failure, in accordance with at least one embodiment of the present disclosure. At the start 710 of the method 700, a reservoir tank temperature sensor measures a temperature of a reservoir tank 720. Then, a hydraulic pump temperature sensor measures a temperature of the hydraulic pump 730. At least one processor then determines a differential temperature by subtracting the temperature of the reservoir tank from the temperature of the hydraulic pump 740. Then, a differential pressure sensor measures the differential pressure across a filter associated with the hydraulic pump 750. At least one processor then compares the differential temperature to a differential temperature threshold 760. Then, at least one processor compares the differential pressure to a differential pressure threshold 770. At least one processor then generates an alert signal indicating failure of the hydraulic pump, when at least one processor determines that the differential temperature exceeds the differential temperature threshold and the differential pressure exceeds the differential pressure threshold 780. Then, the method 700 ends 790.

Figure 8:
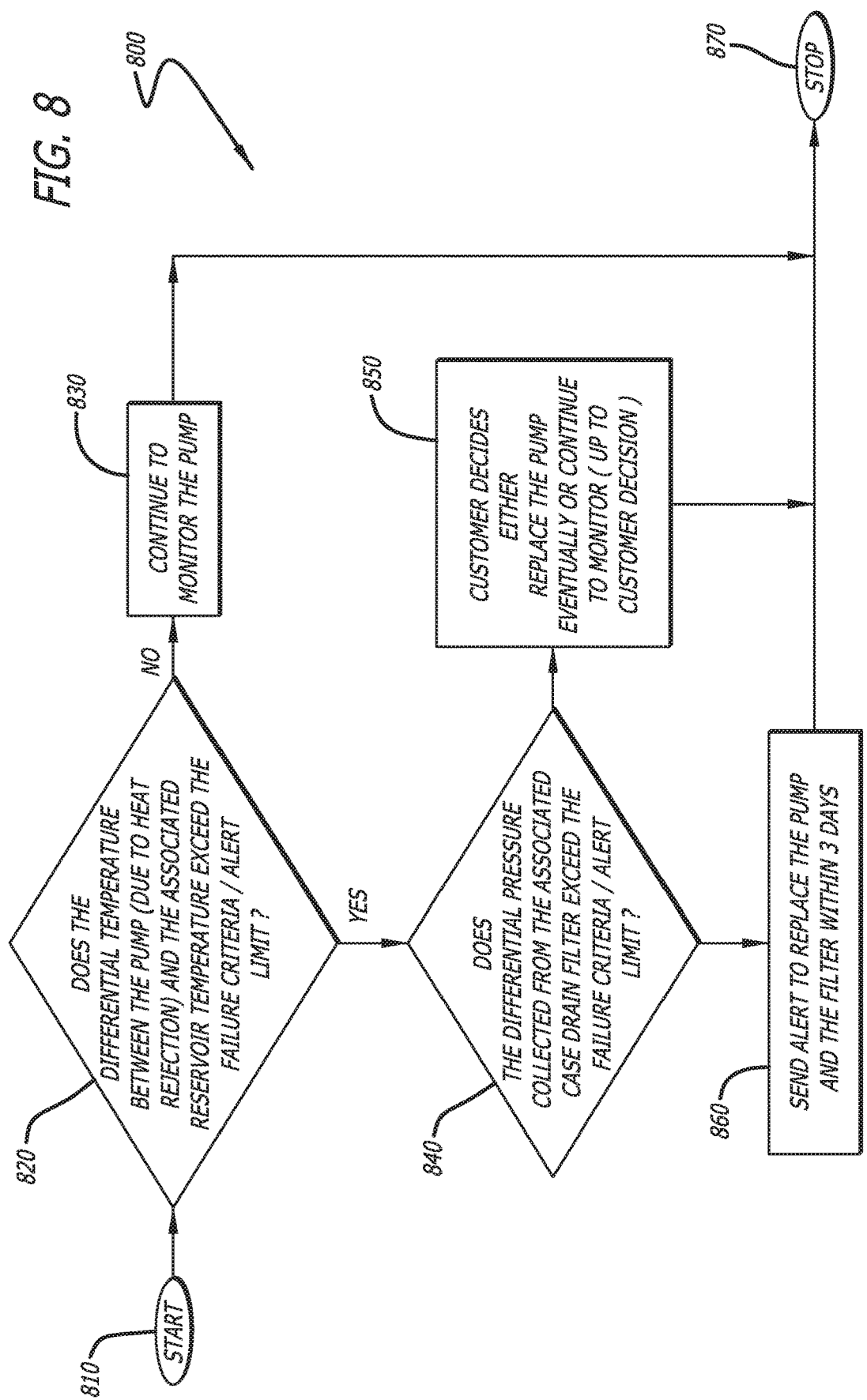
FIG. 8 is a flow chart showing the logic for generating alerts signals and notifications based on the prediction of hydraulic pump health and failure, in accordance with at least one embodiment of the present disclosure.

FIG. 8 is a flow chart showing the logic 800 for generating alerts signals and notifications based on the prediction of hydraulic pump health and failure, in accordance with at least one embodiment of the present disclosure. At the start 810 of the logic 800, at least one processor (e.g., refer processor(s) 610 of FIG. 6) determines whether the differential temperature between the hydraulic pump and its associated reservoir tank temperature exceeds a differential temperature threshold (e.g., failure criteria and/or alert limit) 820.

If at least one processor (e.g., refer processor(s) 610 of FIG. 6) does not determine that the differential temperature between the hydraulic pump and its associated reservoir tank temperature exceeds a differential temperature threshold, at least one processor (e.g., refer processor(s) 610 of FIG. 6) will generate an alert signal(s) indicating to monitor the hydraulic pump 830, and the logic 800 ends 870.

However, if at least one processor (e.g., refer processor(s) 610 of FIG. 6) determines that the differential temperature between the hydraulic pump and its associated reservoir tank temperature exceeds a differential temperature threshold, at least one processor (e.g., refer processor(s) 610 of FIG. 6) will further determine whether the differential pressure collected from the hydraulic pump's associated filter (e.g., case drain filter) exceeds a differential pressure threshold (e.g., failure criteria and/or alert limit) 840.

If at least one processor (e.g., refer processor(s) 610 of FIG. 6) does not determine that the differential pressure exceeds a differential pressure threshold, at least one processor (e.g., refer processor(s) 610 of FIG. 6) will generate an alert signal(s) indicating to monitor or replace (e.g., which is the customer's decision) the hydraulic pump 850, and the logic 800 ends 870.

However, if at least one processor (e.g., refer processor(s) 610 of FIG. 6) determines that the differential pressure exceeds a differential pressure threshold, at least one processor (e.g., refer processor(s) 610 of FIG. 6) will generate an alert signal(s) indicating that the hydraulic pump has failed and should be replaced within a certain number (e.g., three (3)) of days 860, and the logic 800 ends 870.

Exemplary Data

Figure 9:
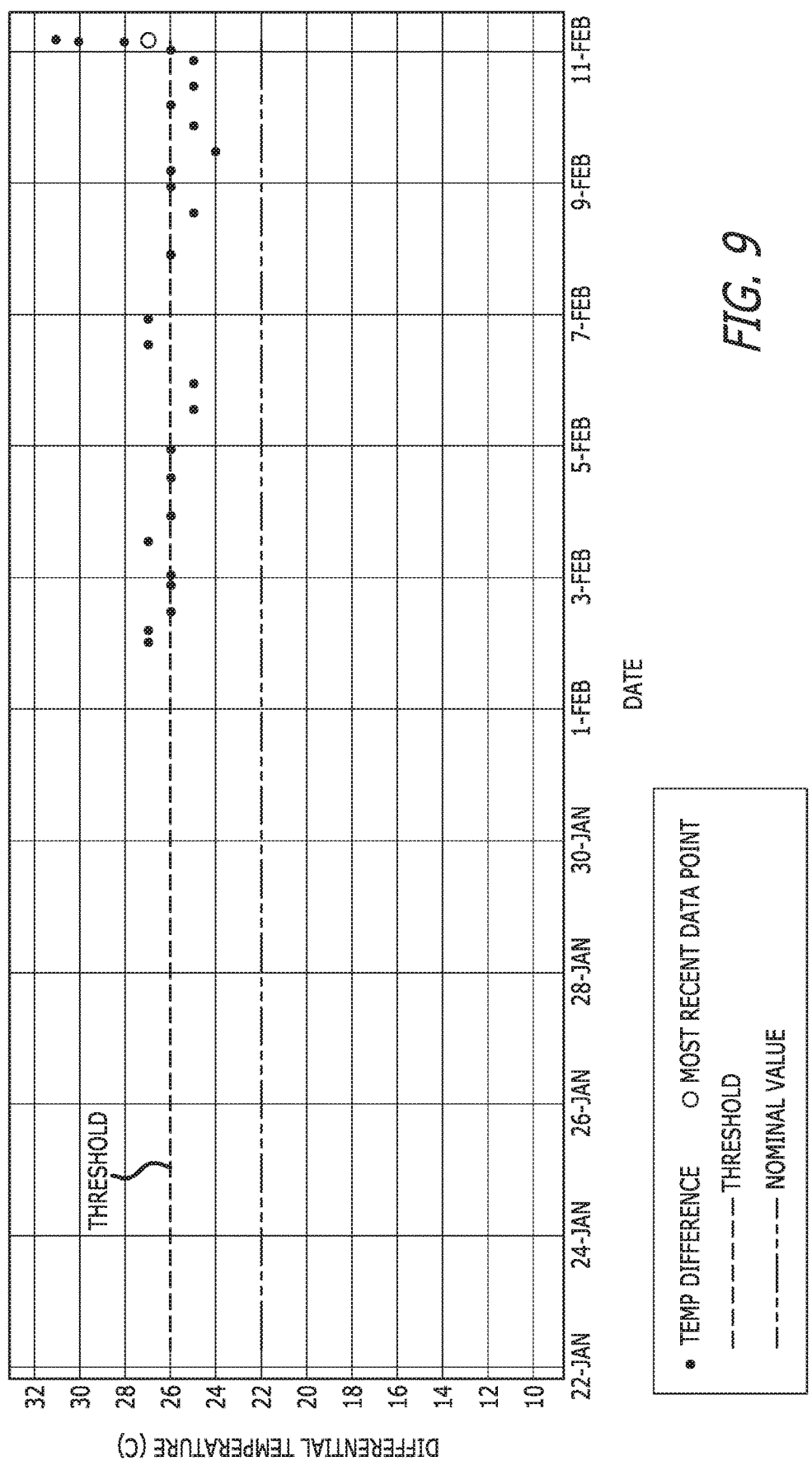
FIG. 9 is a graph showing exemplary differential temperature data taken from a hydraulic system over time, in accordance with at least one embodiment of the present disclosure.

FIG. 9 is a graph 900 showing exemplary differential temperature data taken from a hydraulic system over time, in accordance with at least one embodiment of the present disclosure. In this graph 900, the x-axis denotes time (e.g., date), and the y-axis denotes differential temperature in degrees Celsius (C). On the graph 900, a nominal operating level is shown to at 22 degrees C., and a differential temperature threshold is shown to be located at 26 degrees C. As such, the data points shown to be located above the differential temperature threshold will cause at least one processor(s) (e.g., refer processor(s) 610 of FIG. 6) to generate an alert signal(s).

Figure 10:
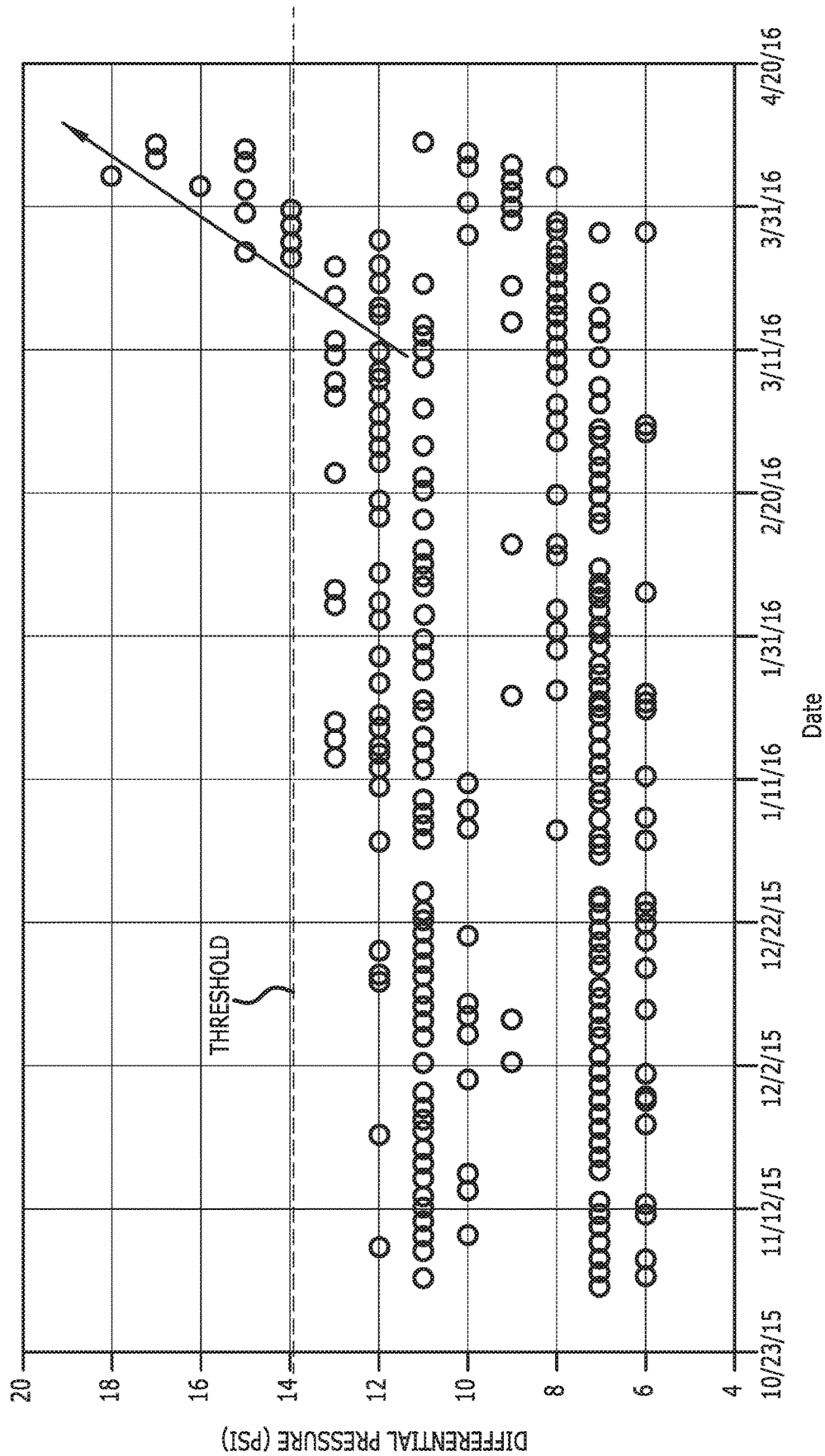
FIG. 10 is a graph showing exemplary differential pressure data taken from a hydraulic system over time, in accordance with at least one embodiment of the present disclosure.

FIG. 10 is a graph 1000 showing exemplary differential pressure data taken from a hydraulic system over time, in accordance with at least one embodiment of the present disclosure. In this graph 1000, the x-axis denotes time (e.g., date), and the y-axis denotes differential pressure in pounds per square inch (psi). On the graph 1000, a differential pressure threshold is shown to be located at 14 psi. As such, the data points shown to be located above the differential pressure threshold will cause at least one processor(s) (e.g., refer processor(s) 610 of FIG. 6) to generate an alert signal(s).

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

Where methods described above indicate certain events occurring in certain order, those of ordinary skill in the art having the benefit of this disclosure would recognize that the ordering may be modified and that such modifications are in accordance with the variations of the present disclosure. Additionally, parts of methods may be performed concurrently in a parallel process when possible, as well as performed sequentially. In addition, more steps or less steps of the methods may be performed.

Accordingly, embodiments are intended to exemplify alternatives, modifications, and equivalents that may fall within the scope of the claims.

Although certain illustrative embodiments and methods have been disclosed herein, it can be apparent from the foregoing disclosure to those skilled in the art that variations and modifications of such embodiments and methods can be made without departing from the true spirit and scope of this disclosure. Many other examples exist, each differing from others in matters of detail only. Accordingly, it is intended that this disclosure be limited only to the extent required by the appended claims and the rules and principles of applicable law.

I claim:

1. A method for predicting health of a hydraulic pump, the method comprising:
    measuring, by a reservoir tank temperature sensor, a temperature of a reservoir tank;
    measuring, by a hydraulic pump temperature sensor, a temperature of the hydraulic pump;
    determining, by at least one processor, a differential temperature by subtracting the temperature of the reservoir tank from the temperature of the hydraulic pump;
    measuring, by a differential pressure sensor, a differential pressure across a filter associated with the hydraulic pump;
    comparing, by the at least one processor, the differential temperature to a differential temperature threshold;
    comparing, by the at least one processor, the differential pressure to a differential pressure threshold; and
    generating, by the at least one processor, an alert signal indicating failure of the hydraulic pump, when the at least one processor determines that the differential temperature exceeds the differential temperature threshold and the differential pressure exceeds the differential pressure threshold.

2. The method of claim 1, wherein the filter is a case drain filter.

3. The method of claim 1, wherein the hydraulic pump is one of an engine-driven pump (EDP) or an electric motor pump (EMP).

4. The method of claim 1, wherein the method further comprises generating, by the at least one processor, an alert signal indicating that the differential temperature exceeds the differential temperature threshold, when the at least one processor determines that the differential temperature exceeds the differential temperature threshold and the differential pressure does not exceed the differential pressure threshold.

5. The method of claim 4, wherein the alert signal indicating that the differential temperature exceeds the differential temperature threshold further indicates that the hydraulic pump should be monitored.

6. The method of claim 1, wherein the method further comprises generating, by the at least one processor, an alert signal indicating that the differential pressure exceeds the differential pressure threshold, when the at least one processor determines that the differential pressure exceeds the differential pressure threshold and the differential temperature does not exceed the differential temperature threshold.

7. The method of claim 6, wherein the alert signal indicating that the differential pressure exceeds the differential pressure threshold further indicates that the hydraulic pump should be one of replaced or monitored.

8. The method of claim 1, wherein a vehicle comprises the hydraulic pump, the filter, and the reservoir tank.

9. The method of claim 8, wherein the vehicle is one of an airborne vehicle, a terrestrial vehicle, or a marine vehicle.

10. The method of claim 9, wherein when the vehicle is the airborne vehicle, the hydraulic pump provides hydraulic power to operate at least one of flight controls, landing gear actuation, nose landing gear steering, high lift devices, or thrust reversers.

11. A system for predicting health of a hydraulic pump, the system comprising:
    a reservoir tank temperature sensor to measure a temperature of a reservoir tank;
    a hydraulic pump temperature sensor to measure a temperature of the hydraulic pump;
    a differential pressure sensor to measure a differential pressure across a filter associated with the hydraulic pump; and
    at least one processor to determine a differential temperature by subtracting the temperature of the reservoir tank from the temperature of the hydraulic pump, to compare the differential temperature to a differential temperature threshold, to compare the differential pressure to a differential pressure threshold, and to generate an alert signal indicating failure of the hydraulic pump, when the at least one processor determines that the differential temperature exceeds the differential temperature threshold and the differential pressure exceeds the differential pressure threshold.

12. The system of claim 11, wherein the filter is a case drain filter.

13. The system of claim 11, wherein the hydraulic pump is one of an engine-driven pump (EDP) or an electric motor pump (EMP).

14. The system of claim 11, wherein the at least one processor is further to generate an alert signal indicating that the differential temperature exceeds the differential temperature threshold, when the at least one processor determines that the differential temperature exceeds the differential temperature threshold and the differential pressure does not exceed the differential pressure threshold.

15. The system of claim 14, wherein the alert signal indicating that the differential temperature exceeds the differential temperature threshold further indicates that the hydraulic pump should be monitored.

16. The system of claim 11, wherein the at least one processor is further to generate an alert signal indicating that the differential pressure exceeds the differential pressure threshold, when the at least one processor determines that the differential pressure exceeds the differential pressure threshold and the differential temperature does not exceed the differential temperature threshold.

17. The system of claim 16, wherein the alert signal indicating that the differential pressure exceeds the differential pressure threshold further indicates that the hydraulic pump should be one of replaced or monitored.

18. The system of claim 11, wherein a vehicle comprises the system.

19. The system of claim 18, wherein the vehicle is one of an airborne vehicle, a terrestrial vehicle, or a marine vehicle.

20. The system of claim 19, wherein when the vehicle is the airborne vehicle, the system provides hydraulic power to operate at least one of flight controls, landing gear actuation, nose landing gear steering, high lift devices, or thrust reversers.

* * * * *